(12) United States Patent
Abe et al.

(10) Patent No.: US 7,866,875 B2
(45) Date of Patent: Jan. 11, 2011

(54) CONCRETE AGITATING DRUM DRIVING DEVICE

(75) Inventors: Masaya Abe, Tokyo (JP); Kunihiro Ando, Tokyo (JP); Yoshihito Iwasaki, Tokyo (JP)

(73) Assignee: Kayaba Industry Co., Ltd., Tokyo (JP)

( * ) Notice: Subject to any disclaimer, the term of this patent is extended or adjusted under 35 U.S.C. 154(b) by 893 days.

(21) Appl. No.: 11/806,621

(22) Filed: Jun. 1, 2007

(65) Prior Publication Data

US 2007/0280035 A1      Dec. 6, 2007

(30) Foreign Application Priority Data

Jun. 2, 2006     (JP)    .............................. 2006-154724

(51) Int. Cl.
*B28C 5/42*     (2006.01)

(52) U.S. Cl. .......................................... 366/61; 60/452

(58) Field of Classification Search ............. 366/53–63, 366/232–233; 60/462–465, 452, 422
See application file for complete search history.

(56) References Cited

U.S. PATENT DOCUMENTS

| | | | | |
|---|---|---|---|---|
| 5,746,509 | A | * | 5/1998 | Gebhard et al. ................ 366/61 |
| 6,074,083 | A | * | 6/2000 | Gebhard et al. ................ 366/61 |
| 6,286,987 | B1 | | 9/2001 | Goode et al. |
| 7,467,889 | B2 | * | 12/2008 | Abe et al. ..................... 366/61 |
| 2007/0280035 | A1 | * | 12/2007 | Abe et al. ..................... 366/31 |
| 2008/0008025 | A1 | * | 1/2008 | Abe et al. ..................... 366/61 |
| 2009/0282824 | A1 | * | 11/2009 | Ando et al. .................... 60/449 |

FOREIGN PATENT DOCUMENTS

| | | | |
|---|---|---|---|
| JP | 07329628 | A * | 12/1995 |
| JP | 2000094432 | A | 4/2000 |
| JP | 2000-272405 | | 10/2000 |
| JP | 2000272406 | A * | 10/2000 |
| JP | 2003246239 | A * | 9/2003 |
| JP | 2007278430 | A * | 10/2007 |
| TW | 483390 | Y | 4/2002 |
| TW | 261917 | Y | 4/2005 |
| WO | WO 9736723 | A1 * | 10/1997 |

* cited by examiner

*Primary Examiner*—Charles E Cooley
(74) *Attorney, Agent, or Firm*—Rabin & Berdo, P.C.

(57) ABSTRACT

A variable capacity hydraulic pump (10) drives a concrete agitating drum (1) via a hydraulic motor (81). A hydraulic actuator (14) regulates a discharge flow rate of the hydraulic pump (10) depending on an actuator driving pressure. A load sensing valve (40) generates the actuator driving pressure by reducing a discharge pressure of the hydraulic pump (10) according to a differential pressure between the discharge pressure and a load pressure acting on the hydraulic motor (81). A shut-off valve (20) shuts off supply of the pressurized oil discharged from the hydraulic pump (10) to the hydraulic motor (81). Due to this action, when the differential pressure increases beyond a predetermined differential pressure, an unload valve (30) drains the discharged oil, thereby preventing the hydraulic pump (10) from generating noise due to an excessive increase in the discharge pressure.

9 Claims, 7 Drawing Sheets

CONCRETE AGITATING DRUM DRIVING DEVICE

FIELD OF THE INVENTION

This invention relates to an agitating drum driving device for a concrete agitating truck using a variable capacity hydraulic pump and a hydraulic motor.

BACKGROUND OF THE INVENTION

JP2000-272405A, published by the Japan Patent Office in 2000, proposes a hydraulic drive circuit for a concrete agitating drum mounted on a ready-mixed concrete agitating truck. The agitating drum is driven by a hydraulic motor.

In this hydraulic drive circuit, the hydraulic motor is supplied with pressurized oil from a variable capacity hydraulic pump via a connection switch-over valve. By operating the connection switch-over valve, the flow direction of the pressurized oil supplied from the variable capacity hydraulic pump to the hydraulic motor is reversed, thereby enabling the hydraulic motor to drive the agitating drum in a normal direction and in a reverse direction.

SUMMARY OF THE INVENTION

In this prior art concrete agitating drum driving device, the connection switch-over valve switches to an operation-stop section to stop driving the agitating drum. When the connection switch-over valve switches to the operation-stop section, a pressure passage and a drain passage of the hydraulic motor are shut off from a suction passage and a discharge passage of the hydraulic pump. Since the hydraulic pump does not stop operating mechanically when the connection switch-over valve switches to the operation-stop section, a discharge pressure of the hydraulic pump increases rapidly after the connection switch-over valve switches to the operation-stop section. Such a rapid increase in the discharge pressure may cause the hydraulic pump to generate noise.

The prior art device comprises a flow rate regulating mechanism which decreases a discharge flow rate of the hydraulic pump as the discharge pressure of the hydraulic pump increases with respect to a load pressure of the hydraulic motor. The mechanism decreases the discharge flow rate of the hydraulic pump to zero when the connection switch-over valve switches to the operation-stop section.

However, a considerable amount of time is required for the discharge flow rate of the hydraulic pump to reach zero under this flow rate regulating mechanism, and hence this mechanism cannot prevent the rapid increase in the discharge pressure of the hydraulic pump which appears immediately after the connection switch-over valve switches to the operation-stop section.

It is therefore an object of this invention to prevent the hydraulic pump from generating noise when stopping an operation of the agitating drum.

In order to achieve the above objects, this invention provides a concrete agitating drum driving device comprising a hydraulic motor connected to a concrete agitating drum, a variable capacity hydraulic pump which drives the hydraulic motor by supplying pressurized oil thereto, a hydraulic actuator which regulates a discharge flow rate of the pressurized oil discharged from the hydraulic pump in response to an actuator driving pressure, a load sensing valve which generates the actuator driving pressure by reducing a discharge pressure of the pressurized oil discharged from the hydraulic pump in response to a differential pressure between the discharge pressure and a load pressure acting on the hydraulic motor, a shut-off valve which shuts off supply of the pressurized oil discharged from the hydraulic pump to the hydraulic motor, and an unload valve which drains the pressurized oil discharged from the hydraulic pump when the differential pressure between the discharge pressure and the load pressure increases beyond a predetermined differential pressure.

The details as well as other features and advantages of this invention are set forth in the remainder of the specification and are shown in the accompanying drawings.

DESCRIPTION OF THE PREFERRED EMBODIMENTS

Figure 1A:
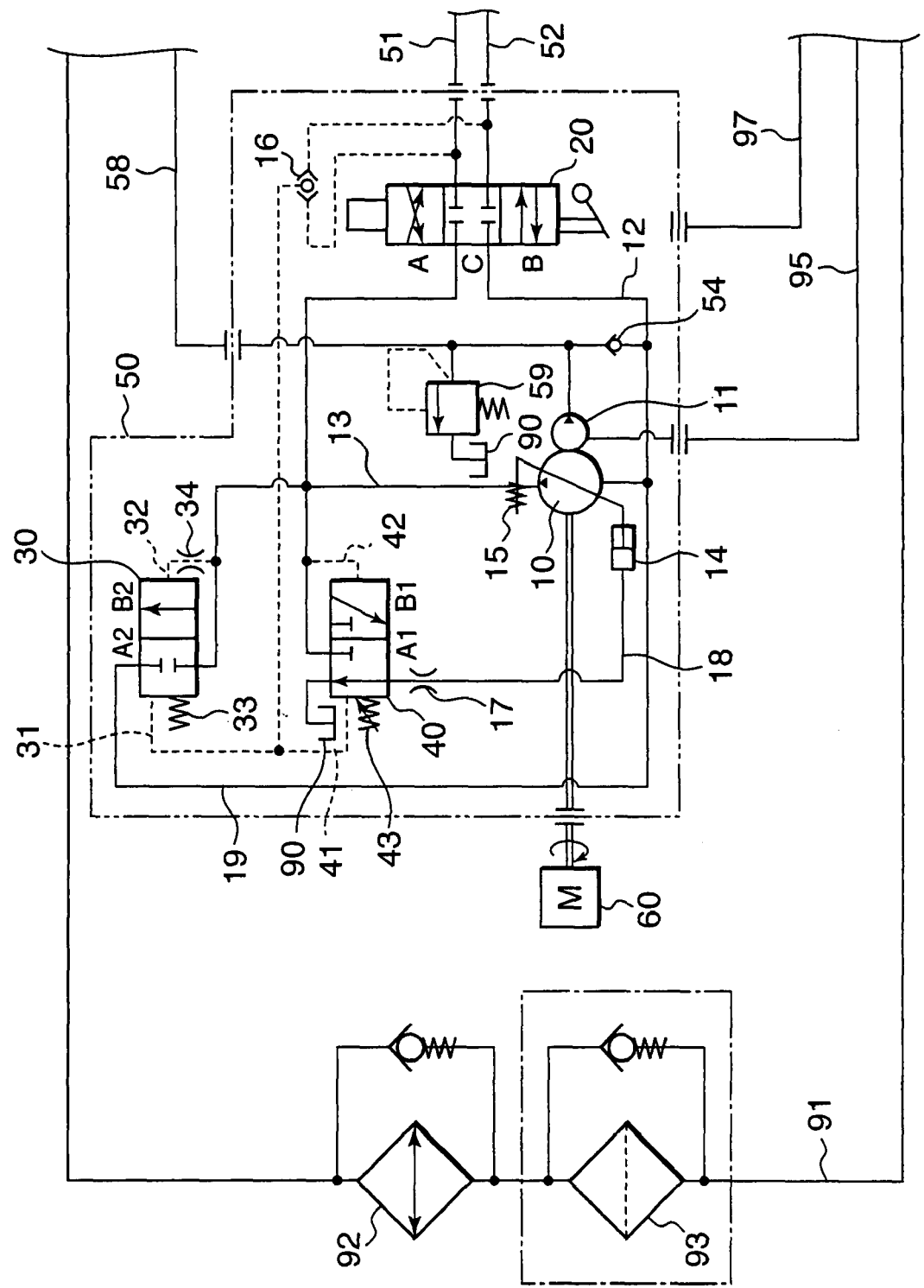
FIGS. 1A and 1B are a hydraulic circuit diagram of a concrete agitating drum driving device according to this invention.
Figure 1B:
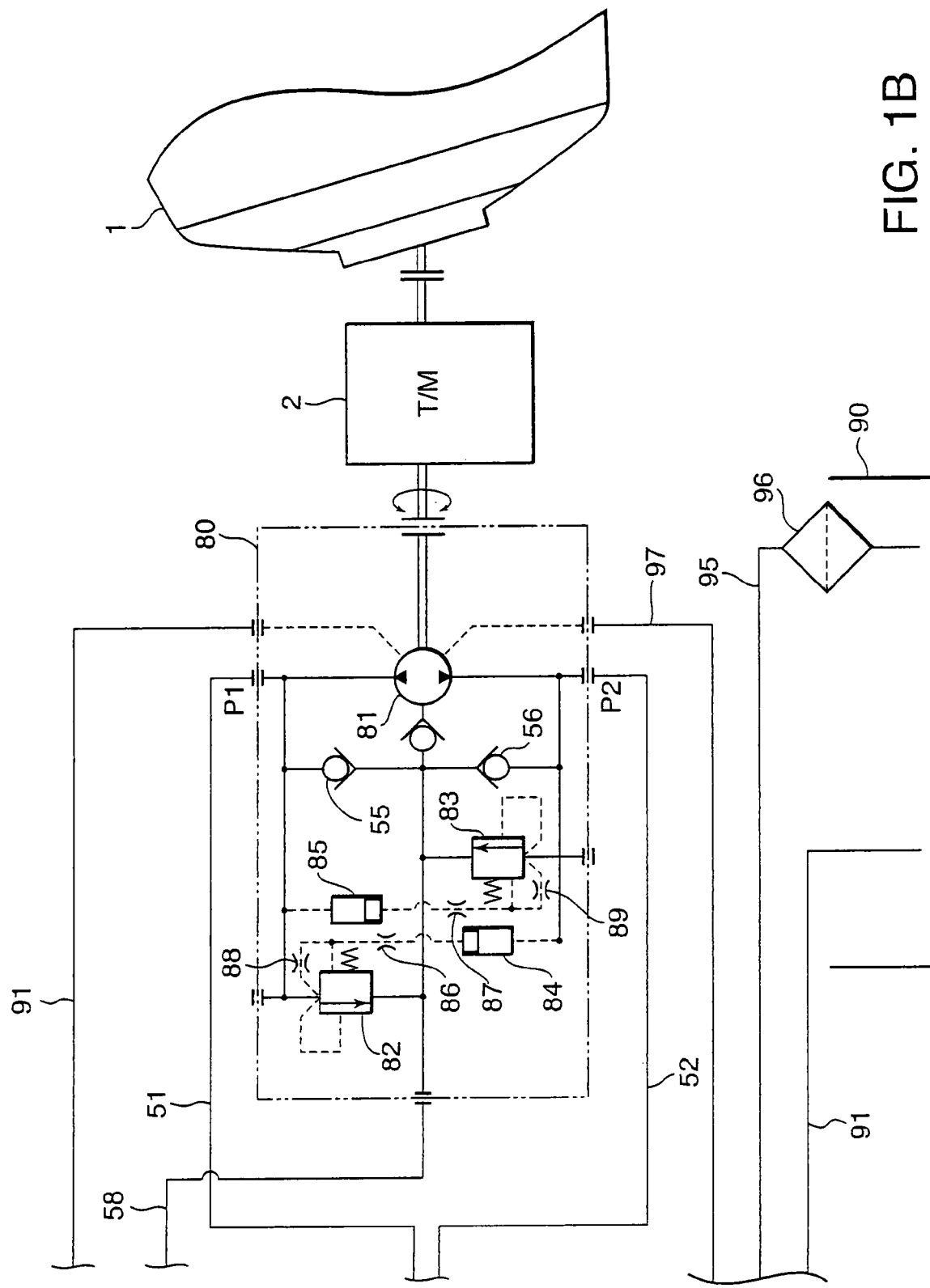

Referring to FIGS. 1A and 1B of the drawings, a concrete agitating drum driving device for a ready-mixed concrete agitating truck comprises a pump unit 50, a motor unit 80, a reservoir 90, and hydraulic passages connecting these units and the reservoir.

The motor unit 80 comprises a hydraulic motor 81 which rotates an agitating drum 1 via a transmission 2.

The hydraulic motor 81 comprises two ports to which a first hydraulic passage 51 and a second hydraulic passage 52 are connected respectively. The hydraulic motor 81 rotates in a normal direction as well as in a reverse direction according to a hydraulic pressure supplied selectively to the first hydraulic passage 51 and the second hydraulic passage 52.

A relief valve 82 is connected to the first hydraulic passage 51. A pressure in the first hydraulic passage 51 is input into the relief valve 82 as a pilot pressure to open the relief valve 82. A pressure in the second hydraulic passage 52 is input into the relief valve 82 via a piston unit 84 and an orifice 86 as a pilot pressure to close the relief valve 82. The pressure in the first hydraulic passage 51 is also input into the relief valve 82 via an orifice 88 as another pilot pressure to close the relief valve 82.

In response to variation in these pilot pressures, the relief valve 82 opens when the pressure in the first hydraulic passage 51 increases rapidly with respect to the pressure in the second hydraulic passage 52 such that a part of the pressurized oil in the first hydraulic passage 51 is released into a charging passage 58, and closes after a while. The relief valve 82 thereby absorbs shock which the hydraulic motor 81 may encounter due to the rapid increase in the pressure in the first hydraulic passage 51.

A relief valve 83 is connected to the second hydraulic passage 52. A pressure in the second hydraulic passage 52 is input into the relief valve 83 as a pilot pressure to open the relief valve 83. A pressure in the first hydraulic passage 51 is input into the relief valve 83 via a piston unit 85 and an orifice 87 as a pilot pressure to close the relief valve 83. A pressure in the second hydraulic passage 52 is also input into the relief valve 83 via an orifice 89 as another pilot pressure to close the relief valve 83.

In response to variation in these pilot pressures, the relief valve 83 opens when the pressure in the second hydraulic passage 52 increases rapidly with respect to the pressure in the first hydraulic passage 51 such that a part of the pressurized oil in the second hydraulic passage 52 is released into the charging passage 58, and closes after a while. The relief valve 83 thereby absorbs shock which the hydraulic motor 81 may encounter due to the rapid increase in the pressure in the second hydraulic passage 52.

To summarize the above, the relief valves 82 and 83 provide a function generally known as a shock-less structure.

The charging passage 58 is connected to the first hydraulic passage 51 via a check valve 55. The charging passage 58 is also connected to the second hydraulic passage 52 via a check valve 56.

The interior of a casing of the motor unit 80 communicates with the reservoir 90 via a drain passage 91. An oil cooler 92 and an oil filter 93 are provided in the drain passage 91.

The pump unit 50 comprises a hydraulic pump 10 driven by an internal combustion engine 60, a charge pump 11, a relief valve 59, a connection switch-over valve 20, a load sensing valve 40, an unload valve 30 and a high-pressure selector valve 16.

The charge pump 11 rotates in synchronization with the hydraulic pump 10 and supplies the charging passage 58 with working oil from the reservoir 90 via a passage 95. The working oil in the charging passage 58 has a function to fill the first hydraulic passage 51 via a check valve 55 and the second hydraulic passage 52 via a check valve 56.

The charging passage 58 communicates with the reservoir 90 via the relief valve 59. The relief valve 59 returns surplus working oil discharged form the charge pump 11 to the reservoir 90 when the pressure in the charging passage 58 rises above a predetermined relief pressure.

Working oil suctioned by the charge pump 11 is supplied from the reservoir 90 via the passage 95. A strainer 96 is provided in the passage 95. A casing of the pump unit 50 and a casing of the motor unit 80 communicate with each other via a drain passage 97.

The hydraulic pump 10 pressurizes working oil suctioned from the suction passage 12 and discharges pressurized oil into the discharge passage 13. The suction passage 12 is filled with the working oil supplied from the charge pump 11 via a check valve 54.

The first hydraulic passage 51 and the second hydraulic passage 52 are connected to the suction passage 12 and the discharge passage 13 via the connection switch-over valve 20. In other words, a closed hydraulic circuit is formed between the hydraulic motor 81 and the hydraulic pump 10.

The connection switch-over valve 20 is switched between three sections A-C by a manual operation performed by an operator. In the discharge section A, the connection switch-over valve 20 connects the suction passage 12 to the first hydraulic passage 51 while connecting the discharge passage 13 to the second hydraulic passage 52. In the agitating section B, the connection switch-over valve 20 connects the discharge passage 13 to the first hydraulic passage 51 while connecting the suction passage 12 to the second hydraulic passage 52. In the operation-stop section C, the connection switch-over valve 20 shuts off the suction passage 12 and discharge passage 13 from the first hydraulic passage 51 and second hydraulic passage 52, respectively.

The connection switch-over valve 20 thereby switches the hydraulic motor 81 between normal rotation, reverse rotation, and rotation stop. The discharge section A is applied when the agitating drum 1 discharges ready-mixed concrete, and the agitating section B is applied when the agitating drum 1 agitates the ready-mixed concrete.

A swash-plate type piston pump is used as the hydraulic pump 10. The hydraulic pump 10 comprises a hydraulic actuator 14 for varying a swash-plate angle. The hydraulic actuator 14 varies the swash-plate angle according to an actuator driving pressure supplied to an actuator passage 18 from the discharge passage 13 via the load sensing valve 40. The hydraulic actuator 14 is arranged to decrease the swash-plate angle as the actuator driving pressure increases. An orifice 17 is interposed in the actuator passage 18.

The load sensing valve 40 has a low-pressure section A1 which connects the actuator passage 18 to a reservoir 90 and a high-pressure section B1 which connects the actuator passage 18 to the discharge passage 13. The load sensing valve 40 applies the low-pressure section A1 and the high-pressure section B1 in a proportion corresponding to a differential pressure between the pump discharge pressure in the discharge passage 13 and a load pressure acting on the hydraulic motor 81 which appears in either of the first hydraulic passage 51 and second hydraulic passage 52.

In other words, the discharge pressure of the hydraulic pump 10 is reduced in response to the differential pressure and then supplied as the actuator driving pressure to the actuator passage 18. It should be noted that the load pressure is a pressure exerted on the hydraulic motor 81 to rotate the agitating drum 1 and the differential pressure between the pump discharge pressure of the hydraulic pump 10 and the load pressure acting on the hydraulic motor 81 is proportional to the flow rate of the pressurized oil in the discharge passage 13.

For this purpose, the load sensing valve 40 comprises a spring 43 which applies a resilient force to the load sensing valve 40 in a direction for applying the low-pressure section A1. The load sensing valve 40 also comprises a first pilot pressure passage 41 which applies a pilot pressure on the load sensing valve 40 in the same direction as the resilient force of the spring 43, and a second pilot pressure passage 42 which applies a pilot pressure on the load sensing valve 40 in the reverse direction to the resilient force of the spring 43, or in other words in a direction for applying the high-pressure section B1.

The first pilot pressure passage 41 is connected to the first hydraulic passage 51 and the second hydraulic passage 52 via a high-pressure selector valve 16. The high-pressure selector valve 16 inputs the higher pressure of the hydraulic pressures in the first hydraulic passage 51 and the second hydraulic passage 52 into the first pilot pressure passage 41. In other words, the high-pressure selector valve 16 inputs the load pressure of the hydraulic motor 81 to the first pilot pressure passage 41. The second pilot pressure passage 42 is connected to the discharge passage 13. The high-pressure selector valve 16 may be constituted by a shuttle valve, for example.

According to the above construction, when the agitating drum 1 is operated, the actuator 14 decreases the swash-plate angle of the hydraulic pump 10 as the differential pressure between the discharge pressure of the hydraulic pump 10 and the load pressure of the hydraulic motor 81 increases, and increases the swash-plate angle of the hydraulic pump 10 as the differential pressure decreases.

When the agitating drum 1 is to stop operating, the connection switch-over valve 20 is switched to the operation-stop section C so as to shut off the discharge passage 13 from the hydraulic motor 81. As a result, the discharge pressure of the hydraulic pump 10 rapidly increases, and the load sensing valve 40 comes to apply only the high-pressure section B1. Accordingly, the pump discharge pressure acts directly on the hydraulic actuator 14 and the hydraulic actuator 14 decreases the swash-plate angle of the hydraulic pump 10 towards zero, or in other words in a decreasing direction in terms of the discharge flow rate of the hydraulic pump 10.

The unload valve 30 has a function to release the discharged pressurized oil of the hydraulic pump 10 in the discharge passage 13 to the suction passage 12 when the differential pressure between the discharge pressure of the hydraulic pump 10 and the load pressure of the hydraulic motor 81 increases beyond a first predetermined differential pressure. The unload valve 30 is interposed in a bypass passage 19 connecting the discharge passage 13 and the suction passage 12.

The unload valve 30 has a loading section A2 which closes the bypass passage 19 and an unloading section B2 which opens the bypass passage 19 to connect the discharge passage 13 to the suction passage 12.

The unload valve 30 is biased by a spring 33 in a direction for applying the loading section A2. The unload valve, 30 is provided with a first pilot pressure passage 31 which applies a pilot pressure to the unload valve 30 in the same direction as the biasing force of the spring 33. The unload valve 30 is also provided with a second pilot pressure passage 32 which applies a pilot pressure to the unload valve 30 in an opposite direction to the biasing force of the spring 33, or in other words in a direction for applying the unloading section B2.

The first pilot pressure passage 31 is connected to the first hydraulic passage 51 and the second hydraulic passage 52 via the high-pressure selector valve 16. The second pilot pressure passage 32 is connected to the discharge passage 13 via an orifice 34.

Figure 2:
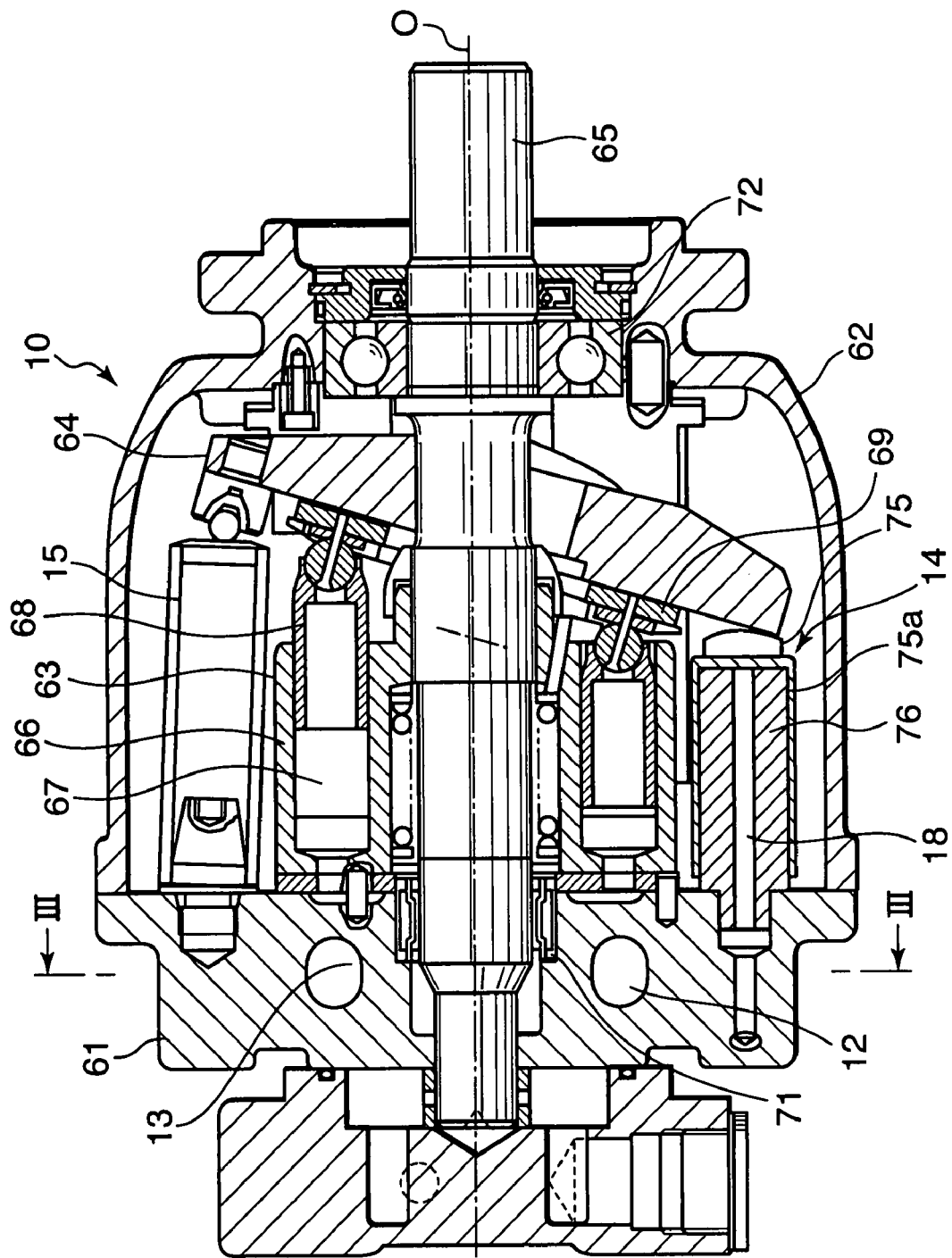
FIG. 2 is a longitudinal sectional view of a hydraulic pump with which the concrete agitating drum driving device is provided.

Referring to FIG. 2, the hydraulic pump 10 is a rotating swash-plate type hydraulic pump and comprises a cylinder block 63 and a swash-plate 64 which are enclosed in a space formed by a pump housing 62 and a pump cover 61 fixed thereto.

The cylinder block 63 is driven to rotate by a shaft 65. The shaft 65 is supported by the pump housing 62 via a bearing 72. A tip of the shaft 65 is supported by the pump cover 61 via a bearing 71. Another tip of the shaft 65 penetrates the pump housing 62 to the outside and is connected to the internal combustion engine 60.

A plurality of cylinders 66 are disposed in the cylinder block 63 in parallel with a center axis O of the shaft 65 and along a circle about the center axis O at regular intervals.

A piston 68 is inserted into each of the cylinders 66. A pressure chamber 67 is formed in the cylinder 66 by the piston 68. A tip of the piston 68 projects from the cylinder 66 in an axial direction and contacts the swash-plate 64 via a shoe. When the cylinder block 63 rotates, each of the pistons 68 is driven in the axial direction by the swash-plate 64 so as to expand/contract the pressure chamber 67 cyclically.

In order to make the discharge flow rate of the hydraulic pump 10 variable, the swash-plate 64 is supported by the pump housing 62 via a trunnion shaft so as to be free to gyrate about the trunnion shaft. A spring 15 disposed in the pump housing 62 supports the swash-plate 64 in a direction for increasing the swash-plate angle.

The actuator 14 is a linear actuator and comprises an inner tube 76 and a plunger 75 which is in contact with the swash-plate 64. The inner tube 76 is fixed to the pump cover 61 so as to be parallel with the center axis O of the shaft 65. The actuator passage 18 penetrates the center of the inner tube 76 in a direction along the center axis O. On the outer circumference of the inner tube 76, an outer tube 75a which forms a base of a plunger 75 is fitted so as to be free to slide in the direction along the center axis O.

The pressure in the actuator passage 18 acts on the rear side of the plunger 75 from within the outer tube 75a. As a result, the plunger 75 pushes the swash-plate 64 towards the right-hand side in the figure to decrease the swash-plate angle against the resilient force of the spring 15. As the pressure in the actuator passage 18 increases, therefore, the swash-plate angle of the hydraulic pump 10 decreases.

Figure 3:
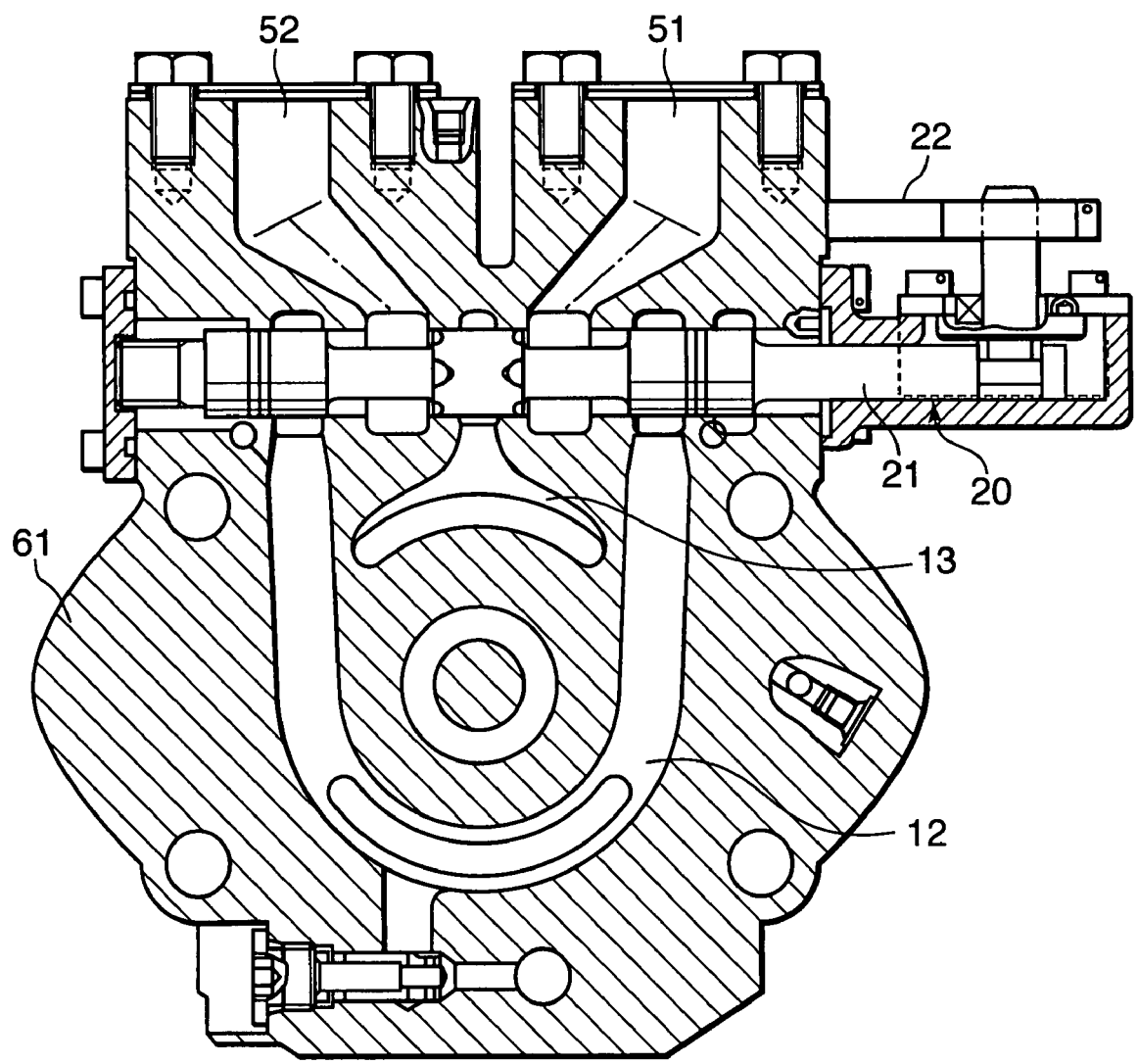
FIG. 3 is a cross sectional view of the hydraulic pump taken along a line III-III in FIG. 2.

Referring to FIG. 3, the connection switch-over valve 20 is disposed within the pump cover 61. The suction passage 12 and the discharge passage 13 are formed inside the pump cover 61. As the cylinder block 63 rotates, working oil is suctioned from the suction passage 12 into each pressure chamber 67 in an elongation stroke of the piston 68, and pressurized oil is discharged therefrom to the discharge passage 13 in a contraction stroke of the piston 68.

The first hydraulic passage 51 and the second hydraulic passage 52 are also led into the pump cover 61.

The connection switch-over valve 20 comprises a valve spool 21. The valve spool 21 displaces in an axial direction in response to an operation of a lever 22. The valve spool 21 in the figure is in the operation-stop section C.

By moving the valve spool 21 towards the right-hand side in the figure from the operation-stop section C, the connection switch-over valve 20 switches to the discharge section A to connect the suction passage 12 to the first hydraulic passage 51 and connect the discharge passage 13 to the second hydraulic passage 52 for discharging the ready-mixed concrete from the agitating drum 1.

By moving the valve spool 21 towards the left-hand side in the figure from the operation-stop section C, the connection switch-over valve 20 switches to the agitating section B to connect the suction passage 12 to the second hydraulic passage 52 and connect the discharge passage 13 to the first hydraulic passage 51 for agitating the ready-mixed concrete.

Figure 4:
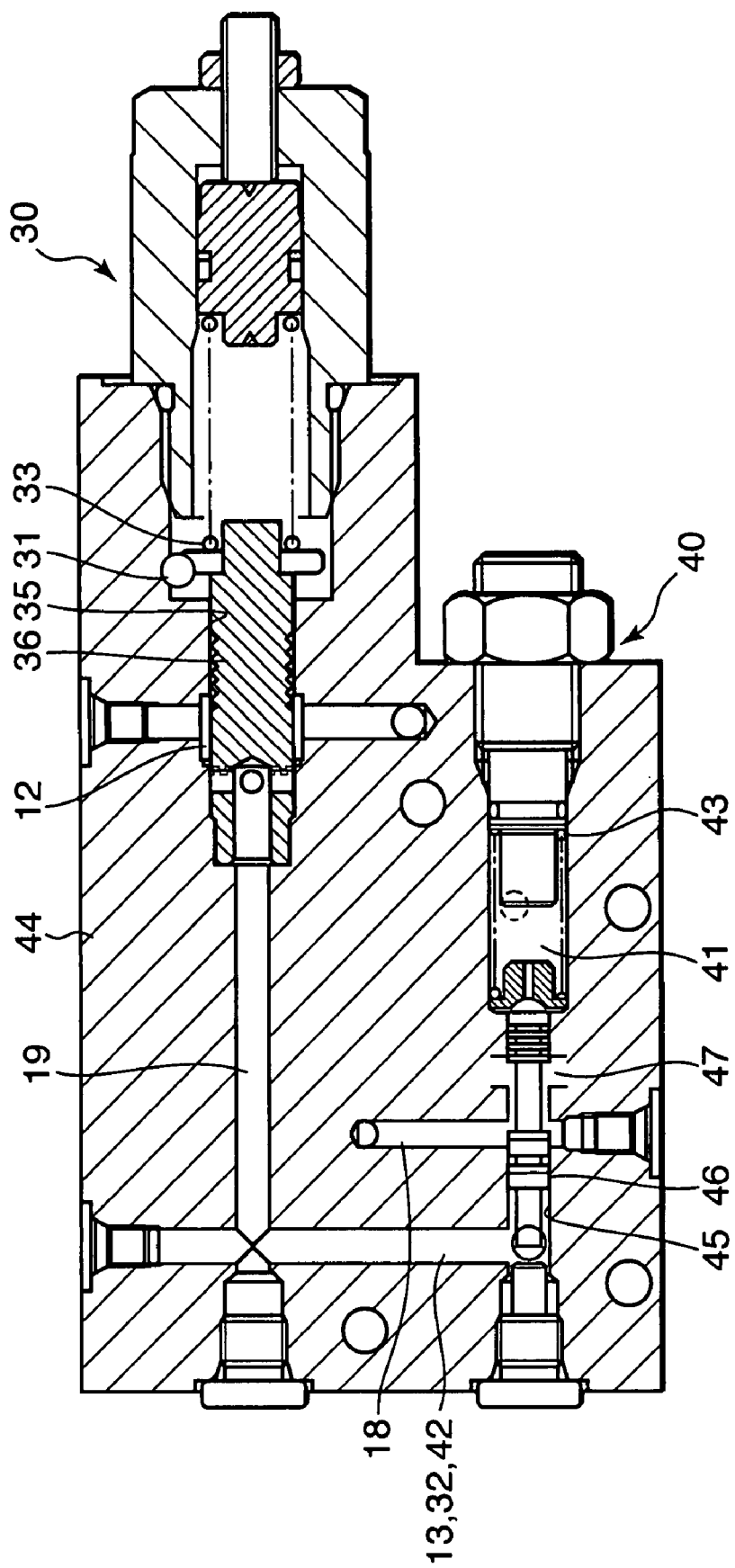
FIG. 4 is a longitudinal sectional view of a load sensing valve and an unload valve according to this invention.

Referring to FIG. 4, the load sensing valve 40 and the unload valve 30 are housed in a valve housing 44 fitted to the pump cover 61.

The load sensing valve 40 comprises a valve spool 46 fitted in a valve hole 45. An end of the valve spool 46 is exposed to a pilot pressure corresponding to the pump discharge pressure which is led from the discharge passage 13 via the second pilot pressure passage 42. Another end of the valve spool 46 is exposed to a pilot pressure corresponding to the load pressure of the hydraulic motor 81 which is led from the first hydraulic passage 51 or the second hydraulic passage 52 via the high pressure selector valve 16 and the first pilot pressure passage 41. Further, the valve spool 46 is biased by the spring 43 in the same direction as the pilot pressure in the first pilot pressure passage 41.

FIG. 4 shows the valve spool 46 in the low-pressure section A1. In this section, the valve spool 46 connects the actuator passage 18 to the passage 47 which is connected to the reservoir 90 and does not connect the actuator passage 18 to the discharge passage 13. As the pump discharge pressure led from the discharge passage 13 through the second pilot pressure passage 42 increases, the valve spool 46 moves in the right-hand direction in the figure from the low-pressure section A1 against the spring 43 and increases an application proportion of the high-pressure section B1. In a position where the high-pressure section B1 is entirely applied, the valve spool 46 connects the actuator passage 18 only to the discharge passage 13.

The unload valve 30 comprises a valve spool 36 fitted into a valve hole 35. An end of the valve spool 36 is exposed to a pilot pressure corresponding to the pump discharge pressure which is led from the discharge passage 13 via the second pilot pressure passage 32. Another end of the valve spool 36 is exposed to a pilot pressure corresponding to the load pressure of the hydraulic motor 81 which is led from the first hydraulic passage 51 or the second hydraulic passage 52 via the high pressure selector valve 16 and the first pilot pressure passage 31. Further, the valve spool 36 is biased by the spring 33 in the same direction as the pilot pressure in the first pilot pressure passage 31.

FIG. 4 shows the valve spool 36 in the loading section A2. In this section, the valve spool 36 closes the bypass passage 19. When the pump discharge pressure led from the discharge passage 13 via the second pilot pressure passage 32 increases, the valve spool 36 moves in the right-hand direction in the figure from the loading section A2 against the spring 33 towards the unloading section B2. In the unloading section B2, the valve spool 36 connects the discharge passage 13 to the suction passage 12 via the bypass passage 19.

The elastic modulus of the spring 33 used in the unload valve 30 is set such that the valve spool 36 moves from the loading section A2 to the unloading section B2 when the differential pressure between the discharge pressure of the hydraulic pump 10 and the load pressure of the hydraulic motor 81 exceeds the first predetermined differential pressure.

In contrast, the elastic modulus of the spring 43 used in the load sensing valve 40 is set such that the valve spool 46 applies only the unloading section B2 after the differential pressure between the discharge pressure of the hydraulic pump 10 and the load pressure of the hydraulic motor 81 exceeds a second predetermined differential pressure.

The first predetermined differential pressure is set to be greater than the second predetermined differential pressure. The first predetermined differential pressure is within a range of 0.1-1.0 megapascals (MPa), for example. By setting the first predetermined differential pressure higher than the second predetermined differential pressure, the valve spool 46 in the figure first moves to the high-pressure section B1, and then the valve spool 36 moves to the unloading section B2 as the discharge pressure of the hydraulic pump 10 increases.

When the agitating drum 1 operates, the internal combustion engine 60 drives the hydraulic pump 10 to rotate. The hydraulic pump 10 then suctions low-pressure working oil from the suction passage 12 and discharges pressurized working oil into the discharge passage 13. By shifting the connection switch-over valve 20 to any one of the sections A and B, one of the first hydraulic passage 51 and the second hydraulic passage 52 is supplied with the pressurized working oil, and the low-pressure working oil is recirculated from the other of the first hydraulic passage 51 and the second hydraulic passage 52 to the suction passage 12. By circulating the working oil between the hydraulic pump 10 and the hydraulic motor 81 in this way, the hydraulic motor 81 rotates, and the rotation is transmitted to the agitating drum 1 via the transmission 2.

When the differential pressure between the pump discharge pressure in the discharge passage 13 and the load pressure of the hydraulic motor 81 is within the first predetermined differential pressure while driving the agitating drum 1 to rotate, the unload valve 30 stays in the loading section A2 so as to close the bypass passage 19. In this state, the load sensing valve 40 regulates the hydraulic pressure supplied to the hydraulic actuator 14 such that the differential pressure between the pump discharge pressure in the discharge passage 13 and the load pressure of the hydraulic motor 81 is kept at a constant value.

When stopping the operation of the agitating drum 1, the connection switch-over valve 20 is switched from the discharge section A or the agitating section B to the operation-stop section C. According to this operation, the first hydraulic passage 51 and the second hydraulic passage 52 are shut off and the hydraulic motor 81 stops rotating.

In this state, the hydraulic pump 10 is still in operation, and as a result, the pump discharge pressure in the discharge passage 13 increases rapidly. As this rapid increase in the pump discharge pressure occurs, the valve spool 36 moves in the right-hand direction in the figure and reaches the unloading section B2 in the unload valve 30. As a result, the discharge passage 13 and the suction passage 12 communicate with each other via the bypass passage 19, and thereafter, the discharged oil from the hydraulic pump 10 is recirculated to the suction passage 12.

When the agitating drum 1 stops operating, the unload valve 30 connects the discharge passage 13 and the suction passage 12 in this way as the pressure in the discharge passage 13 increases. Thus, a rapid increase in the discharge pressure of the hydraulic pump 10 due to switching the connection switch-over valve 20 to the operation-stop section C is prevented. According to the agitating drum driving device according to this invention, therefore, noise generation by the hydraulic pump 10 when the connection switch-over valve 20 is switched to the operation-stop section C does not occur.

As a result of the communication between the discharge passage 13 and the suction passage 12, the differential pressure between the pump discharge pressure in the discharge passage 13 and the load pressure of the hydraulic motor 81 decreases. When the differential pressure falls below the first predetermined differential pressure, the unload valve 30 switches to the loading section A2 again.

As described above, the first predetermined differential pressure is set to be greater than the second predetermined differential pressure, and hence when the pump discharge pressure in the discharge passage 13 increases, the load sensing valve 40 comes to apply only the high-pressure section B1 before the unload valve 30 switches to the unloading section B2. As a result, the hydraulic actuator 14 starts to operate to reduce the swash-plate angle of the hydraulic pump 10 using the pump discharge pressure in the discharge passage 13 against the spring 15 before the unload valve 30 switches to the unloading section B2.

The unloading action of the unload valve 30 is started only when the first predetermined differential pressure, which is greater than the second predetermined differential pressure, is reached, and the reducing operation of the swash-plate angle by the load sensing valve 40 and the hydraulic actuator 14 is performed irrespective of the unloading operation of the unload valve 30. In other words, the unload valve 30 prevents noise generation by the hydraulic pump 10 by suppressing a rapid increase in the pressure in the discharge passage 13 without disturbing the load sensing valve 40 and the hydraulic actuator 14 which are in operation to reduce the swash-plate angle of the hydraulic pump 10.

Figure 5A:
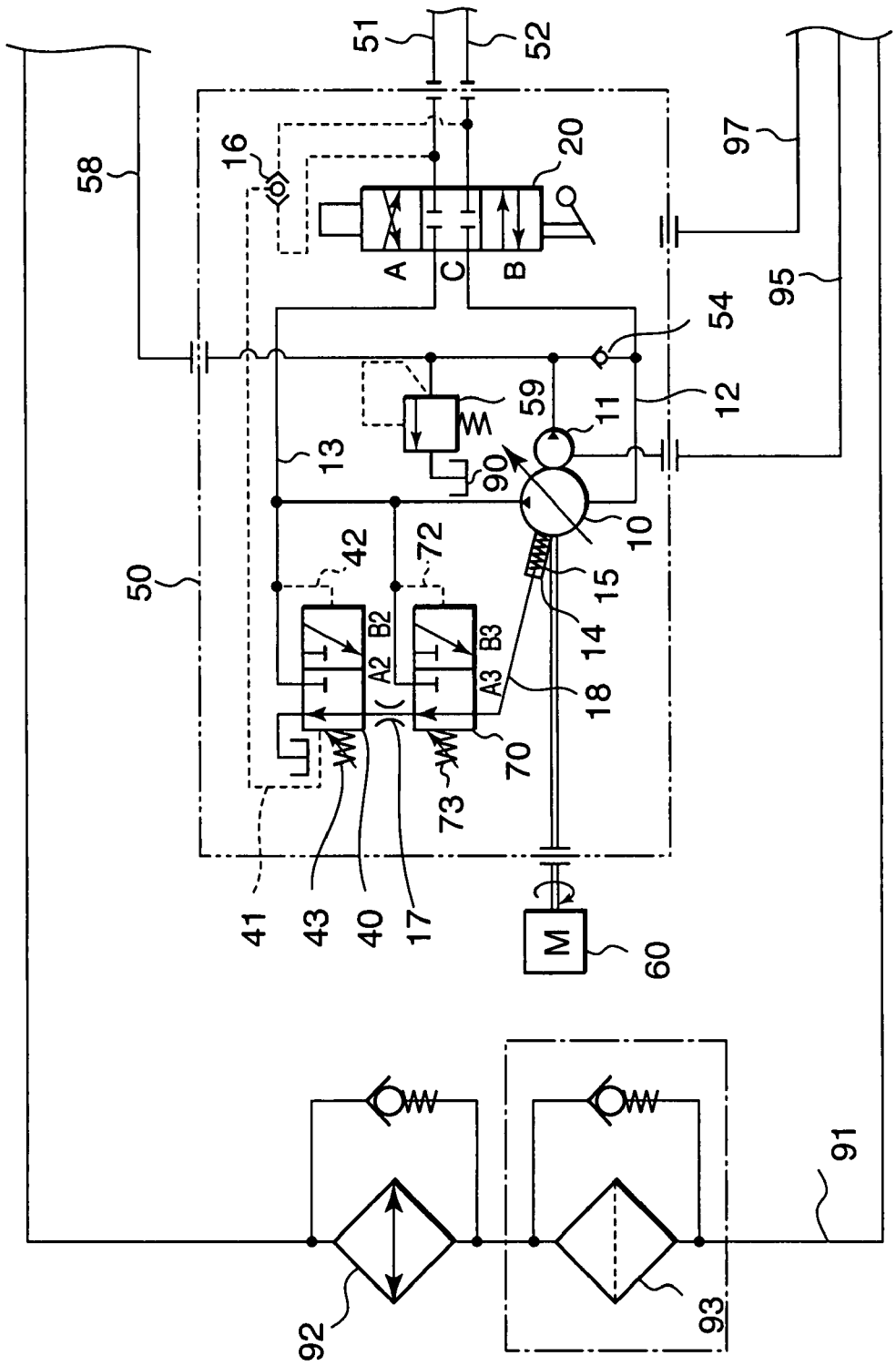
FIGS. 5A and 5B are a hydraulic circuit diagram of a concrete agitating drum driving device according to a prior art.
Figure 5B:
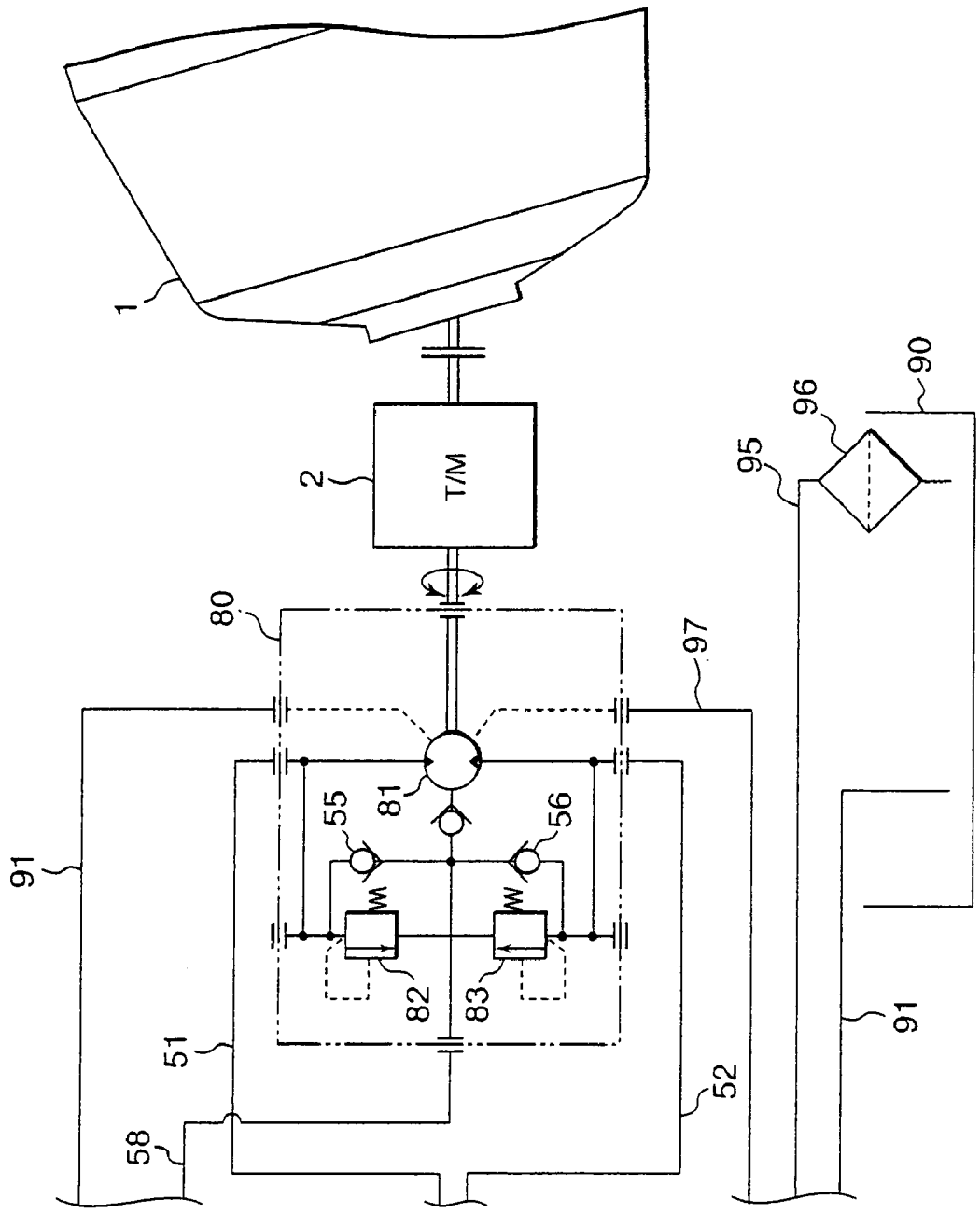

FIGS. 5A and 5B show a prior art concrete agitating drum driving device. A cutoff valve 70 is provided in the prior art device to decrease the discharge flow rate of the hydraulic pump 10 by increasing the actuator driving pressure supplied to the actuator passage 18 when the pump discharge pressure introduced from the discharge passage 13 rises beyond a predetermined pressure.

The cutoff valve 70 has a low-pressure section A3 which connects the actuator passage 18 to the reservoir 90, and a high-pressure section B3 which connects the actuator passage 18 to the discharge passage 13.

A pilot pressure passage 72 which communicates with the discharge passage 13 is connected to the cutoff valve 70. In the cutoff valve 70, a spring 73 biases the cutoff valve 70 in a direction for applying the low-pressure section A3. The pump discharge pressure led through the pilot pressure passage 72 pushes the cutoff valve 70 in a reverse direction to the biasing force of the spring 73, or in other words in a direction for applying the high-pressure section B3. The elastic modulus of the spring 73 is set such that the cutoff valve 70 switches from the low-pressure section A3 to the high-pressure section B3 when the pilot pressure in the pilot pressure passage 72 reaches 10-40 MPa, for example.

When driving the agitating drum 1 to rotate, the cutoff valve 70 remains in the low-pressure section A3 which connects the actuator passage 18 to the load sensing valve 40, as long as the pump discharge pressure is within the predetermined pressure. In this state, the load sensing valve 40 regulates the actuator driving pressure supplied to the hydraulic actuator 14 such that the differential pressure between the pump discharge pressure in the discharge passage 13 and the load pressure of the hydraulic motor 81 is kept at a constant value.

When stopping the operation of the agitating drum 1, the connection switch-over valve 20 is switched to the operation-stop section C. According to this operation, the discharge passage 13 is closed but the hydraulic pump 10 still operates to discharge pressurized oil to the discharge passage 13, and hence the pressure in the discharge passage 13 rises rapidly. When this pressure rises beyond the predetermined pressure, the cutoff valve 70 accordingly switches from the low-pressure section A3 to the high-pressure section B3.

As a result, the actuator passage 18 is connected to the discharge passage 13, and the pump discharge pressure in the discharge passage 13 drives the hydraulic actuator 14 against the spring 15 in a direction for reducing the swash-plate angle of the hydraulic pump 10, or in a direction for reducing the discharge flow rate of the hydraulic pump 10.

Due to the reduction in the swash-plate angle, a mechanical load for rotating the hydraulic pump 10 decreases, and fuel consumption by the internal combustion engine 60 driving the hydraulic pump 10 is also reduced.

However, a considerable amount of time is required until the hydraulic actuator 14 reduces the pump discharge flow rate of the hydraulic pump 10 to zero from the point at which the connection switch-over valve 20 switches to the operation-stop section C. If the discharge pressure of the hydraulic pump 10 rises rapidly in the mean time, the hydraulic pump 10 may generate noise.

This invention replaces the cutoff valve 70 with the unload valve 30. The unload valve 30 operates whenever the differential pressure between the pump discharge pressure and the load pressure increases beyond the first predetermined differential pressure, including a case where the operation of the agitating drum 1 is stopped to prevent the rapid increase in the discharge pressure of the hydraulic pump 10 irrespective of the operation state of the hydraulic actuator 14. Prevention of rapid increase in the discharge pressure of the hydraulic pump 10 is thereby ensured without failure.

Further, in the prior art device shown in FIGS. 5A and 5B, the elastic modulus of the spring 73 which biases the cutoff valve 70 in a direction for applying the high-pressure section B3 is set such that the cutoff valve 70 does not switch to the low-pressure section A3 during a normal operation of the hydraulic pump 10. More specifically, the elastic modulus of the spring 73 has to be set such that the cutoff valve 70 switches from the low-pressure section A3 to the high-pressure section B3 only when the pressure in the pilot pressure passage 72 reaches 10-40 MPa, for example.

The unload valve 30 with which the driving device according to this invention is provided operates in response to the differential pressure between the discharge pressure of the hydraulic pump 10 and the load pressure of the hydraulic motor 81. The elastic modulus of the spring 33 biasing the valve spool 36 in a direction for applying the unloading section B2 may be set such that switching from the loading section A2 to the unloading section B2 is performed when the differential pressure reaches 0.1-1.0 MPa, for example. This means that the elastic modulus of the spring 33 can be set at a much smaller value than the elastic modulus of the spring 73 in the cutoff valve 70, and hence the size of the spring 33 can be made smaller than the spring 73.

The contents of Tokugan 2006-154724, with a filing date of Jun. 2, 2006 in Japan, are hereby incorporated by reference.

Although the invention has been described above with reference to a certain embodiment of the invention, the invention is not limited to the embodiment described above. Modifications and, variations of the embodiment described above will occur to those skilled in the art, within the scope of the claims.

For example, the connection switch-over valve 20 may be replaced by any kind of shut-off valve having a function to shut off the discharge passage 13 from the hydraulic motor 81.

The bypass passage 19 does not have to be connected to the suction passage 12, and may be connected to the reservoir 90.

In order to rotate the hydraulic pump 10, any rotating machine including an electric motor may be applied instead of the internal combustion engine 60.

The embodiments of this invention in which an exclusive property or privilege is claimed are defined as follows:

What is claimed is:

1. A concrete agitating drum driving device comprising:
    a hydraulic motor connected to a concrete agitating drum;
    a variable capacity hydraulic pump which drives the hydraulic motor by supplying pressurized oil thereto;
    a hydraulic actuator which regulates a discharge flow rate of the pressurized oil discharged from the hydraulic pump in response to an actuator driving pressure;
    a load sensing valve which generates the actuator driving pressure by reducing a discharge pressure of the pressurized oil discharged from the hydraulic pump in response to a differential pressure between the discharge pressure and a load pressure acting on the hydraulic motor;
    a shut-off valve which shuts off supply of the pressurized oil discharged from the hydraulic pump to the hydraulic motor; and
    an unload valve which drains the pressurized oil discharged from the hydraulic pump when the differential pressure between the discharge pressure and the load pressure increases beyond a predetermined differential pressure.

2. The concrete agitating drum driving device as defined in claim 1, wherein the unload valve comprises a valve spool which selectively applies a loading section which does not drain the pressurized oil discharged from the hydraulic pump, and an unloading section which drains the pressurized oil discharged from the hydraulic pump, a spring which biases the valve spool in a direction for applying the loading section, a first pilot pressure passage which applies the discharge pressure to the valve spool as a pilot pressure biasing the valve spool in a direction for applying the loading section, and a second pilot pressure passage which applies the load pressure to the valve spool as a pilot pressure biasing the valve spool in a direction for applying the unload section.

3. The concrete agitating drum driving device as defined in claim 1, wherein the load sensing valve is configured to supply the discharge pressure to the hydraulic actuator without reducing the discharge pressure when the differential pressure increases beyond a second predetermined differential pressure which is set smaller than the first predetermined differential pressure.

4. The concrete agitating drum driving device as defined in claim 1, wherein the first predetermined differential pressure is set within a range of 0.1-1.0 megapascals.

5. The concrete agitating drum driving device as defined in claim 1, wherein the load sensing valve comprises a valve spool which applies a low-pressure section, which releases the actuator driving pressure to the reservoir, and a high-pressure section, which supplies the hydraulic actuator with the discharge pressure as the actuator driving pressure, in a proportion depending on the differential pressure, a spring which biases the valve spool in a direction for applying the low-pressure section, a first pilot pressure passage which applies the load pressure as a pilot pressure to the valve spool in the same direction as a biasing force of the spring, and a second pilot pressure passage which applies the discharge pressure as a pilot pressure to the valve spool in a reverse direction to the biasing force of the spring.

6. The concrete agitating drum driving device as defined in claim 1, further comprising a closed circuit including a first hydraulic passage and a second hydraulic passage connecting the hydraulic motor to the hydraulic pump, and a high-pressure selector valve which extracts the higher of a hydraulic pressure in the first hydraulic passage and a hydraulic pressure in the second hydraulic passage as the load pressure.

7. The concrete agitating drum driving device as defined in claim 6, wherein the hydraulic pump comprises a suction passage and a discharge passage, the shut-off valve is constituted by a connection switch-over valve which selectively applies a discharge section which connects the discharge passage to the second hydraulic passage and connects the suction passage to the first hydraulic passage, an agitating section which connects the discharge passage to the first hydraulic passage and connects the suction passage to the second hydraulic passage, and an operation-stop section which shuts off the discharge passage and the suction passage from the first hydraulic passage and the second hydraulic passage.

8. The concrete agitating drum driving device as defined in claim 7, wherein the hydraulic pump comprises a swash plate which varies the discharge flow rate according to a swash-plate angle, and a spring which supports the swash plate in a direction for increasing the swash-plate angle, and the hydraulic actuator pushes the swash plate using the actuator driving pressure in a direction to reduce the swash-plate angle against the spring.

9. The concrete agitating drum driving device as defined in claim 7, wherein the connection switch-over valve, the unload valve, the load sensing valve, the high-pressure selector valve, and the hydraulic pump are integrated into a unit.

\* \* \* \* \*